United States Patent
Zhang et al.

(10) Patent No.: US 9,683,503 B2
(45) Date of Patent: Jun. 20, 2017

(54) MANAGING LOAD SHARING AMONG MULTIPLE ENGINES

(71) Applicant: CATERPILLAR INC., Peoria, IL (US)

(72) Inventors: Yanchai Zhang, Dunlap, IL (US); Insu Chang, Peoria, IL (US); James Chase, Chillicothe, IL (US); Vijay Janardhan, Dunlap, IL (US); Perry D. Converse, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/827,370

(22) Filed: Aug. 17, 2015

(65) Prior Publication Data
US 2017/0051692 A1 Feb. 23, 2017

(51) Int. Cl.
*G06F 19/00* (2011.01)
*F02D 41/02* (2006.01)
*F02D 41/24* (2006.01)
*G01L 3/24* (2006.01)

(52) U.S. Cl.
CPC ..... *F02D 41/0205* (2013.01); *F02D 41/2406* (2013.01); *G01L 3/24* (2013.01)

(58) Field of Classification Search
CPC ... F02D 41/0205; F02D 41/2406; G01L 3/24; B63H 21/12; B63H 5/08
USPC ....... 701/99, 22, 54; 440/3; 700/295; 307/84
See application file for complete search history.

(56) References Cited

U.S. PATENT DOCUMENTS

| | | | |
|---|---|---|---|
| 2,669,173 A * | 2/1954 | Severance | A01B 39/085 |
| | | | 172/121 |
| 4,066,913 A | 1/1978 | Manning et al. | |
| 6,066,897 A | 5/2000 | Nakamura | |
| 6,273,771 B1 * | 8/2001 | Buckley | B63H 21/213 |
| | | | 114/144 RE |
| 2008/0058998 A1 * | 3/2008 | Breit | H02J 3/14 |
| | | | 700/295 |
| 2008/0306664 A1 * | 12/2008 | Guo | F16H 61/66 |
| | | | 701/54 |
| 2009/0276103 A1 | 11/2009 | Iwamoto et al. | |
| 2010/0144219 A1 * | 6/2010 | Balogh | B63H 21/20 |
| | | | 440/3 |
| 2010/0274407 A1 * | 10/2010 | Creed | H02J 3/14 |
| | | | 700/295 |

(Continued)

FOREIGN PATENT DOCUMENTS

CN 101577425 3/2013
DE 102010003706 10/2010

(Continued)

*Primary Examiner* — Shardul Patel

(57) ABSTRACT

A method and a system of managing load sharing among a plurality of power sources are disclosed. According to certain embodiments, the method includes determining a total power output to be directed from the plurality of power sources to at least one power consumer. The method also includes retrieving a Brake Specific Fuel Consumption (BSFC) curve associated with each of the plurality of power sources. The method further includes determining an operating priority for each of the plurality of power sources based on operating constraints associated with the respective power source. The method further includes determining a load share for each of the plurality of power sources based on at least the total power output, the BSFC curves, and the operating priorities.

17 Claims, 3 Drawing Sheets

(56) References Cited

U.S. PATENT DOCUMENTS

| | | | |
|---|---|---|---|
| 2011/0169333 A1 | 7/2011 | Cohen et al. | |
| 2012/0083173 A1* | 4/2012 | McMillan | B63H 21/20 440/6 |
| 2012/0232731 A1* | 9/2012 | Sujan | B60W 10/06 701/22 |
| 2013/0342020 A1* | 12/2013 | Blevins | H02J 4/00 307/84 |

FOREIGN PATENT DOCUMENTS

| | | |
|---|---|---|
| JP | 05056188 | 10/2012 |
| KR | 20120033824 | 4/2012 |
| WO | WO 2010031399 | 3/2010 |
| WO | WO 2011015198 | 2/2011 |

* cited by examiner

| Exemplary Load Share Distribution | | | | |
|---|---|---|---|---|
| Priority | Identical | Same Share | Load Share | |
| 1 | ✓ | | 60% | |
| 1 | ✓ | | 40% | |
| 2 | ✓ | ✓ | 25% | |
| 2 | ✓ | ✓ | 25% | |
| 2 | | | 50% | |

MANAGING LOAD SHARING AMONG MULTIPLE ENGINES

TECHNICAL FIELD

The present disclosure relates generally to managing load sharing among multiple engines of a machine, and more particularly, to methods and systems of managing load sharing among multiple engines to reduce the total fuel consumption.

BACKGROUND

Mobile machines, such as marine vessels, often include multiple engines harnessed together to drive one or more primary loads (e.g., propellers) and various auxiliary loads (e.g., HVAC, lighting, pumps, etc.). These engines may have different operating ranges, speeds, etc. The engines can be mechanically connected to the loads or electrically connected to the loads by way of generators. In some applications, the loads of a vessel can be driven both mechanically and electrically in a hybrid arrangement.

In typical marine applications, multiple engines are simultaneously operated to satisfy a power demand. Each of the multiple engines produces a share of the power demand proportional to the engine's capacity. For example, a particular marine vessel may have two engines capable of producing 2,000 kW each, and two engines capable of producing 5,000 kW each. If the total power demand is 7,000 kW, the share of the load distributed to each engine may be 1,000 kW, 1,000 kW, 2,500 kW, and 2,500 kW, respectively. However, such a rigid load-sharing configuration may not be the most fuel efficient one. This is because each engine may have a particular fuel consumption curve nonlinearly dependent on the power produced by the engine. For instance, it may be more fuel efficient to distribute the load such that the engines produce 1,200 kW, 500 kW, 2,300 kW, and 3,000 kW, respectively.

An attempt at improving power generating efficiency is disclosed in Chinese Patent No. 101577425 to Toruya et al. (Toruya) that published on Mar. 27, 2013. Toruya discloses a load distributing system used in a power grid. The power grid has multiple generators sets. The system stores a fuel consumption curve associated with each generator set. For a given power demand, the system uses the fuel consumption curves to compute a load-sharing configuration that leads to a minimum total fuel consumption. The system works only offline and stores the computation results in a table. Later, when the power grid receives a power demand, the system or a human operator can look up the corresponding load-sharing configuration in the table.

Although Toruya offers a way of quantitatively determining a load-sharing configuration among multiple generator sets to reduce the total fuel consumption, it does not adequately consider the differences among the generator sets. For example, generator sets with the same fuel consumption curve may operate under different operating constraints, and therefore have different operating priorities in the load sharing. Sometimes, it may be desired for a lower-priority generator set to participate in the load sharing only after the combined power output produced by all the higher-priority generator sets exceeds a certain threshold. Moreover, Toruya only works offline and may not timely respond to rapid changes of the power demand.

The disclosed system is directed to overcoming one or more of the problems set forth above and/or other problems of the prior art.

SUMMARY OF THE INVENTION

In one aspect, the present disclosure is directed to a method of managing load sharing among a plurality of power sources. The method includes determining a total power output to be directed from the plurality of power sources to at least one power consumer. The method also includes retrieving a Brake Specific Fuel Consumption (BSFC) curve associated with each of the plurality of power sources. The method further includes determining an operating priority for each of the plurality of power sources based on operating constraints associated with the respective power source. The method further includes determining a load share for each of the plurality of power sources based on at least the total power output, the BSFC curves, and the operating priorities.

In another aspect, the present disclosure is directed to a power system. The power system includes a plurality of power sources configured to provide power to at least one power consumer. The power system also includes a load manager associated with the at least one consumer and configured to determine a total power output to be directed from the plurality of power sources to the at least one power consumer. The power system further includes a power distribution module communicatively connected with the load manger and the plurality of power sources. The power distribution module is configured to retrieve a BSFC curve associated with each of the plurality of power sources. The power distribution module is also configured to determine an operating priority for each of the plurality of power sources based on operating constraints associated with the respective power source. The power distribution module is further configured to determine a load share for each of the plurality of power sources based on at least the total power output, the BSFC curves, and the operating priorities.

In yet another aspect, the present disclosure is directed to a non-transitory computer-readable storage medium storing instructions for managing load sharing among a plurality of power sources. The instructions cause at least one processor to perform operations including determining a total power output to be directed from the plurality of power sources to at least one power consumer. The operations also include retrieving a BSFC curve associated with each of the plurality of power sources. The operations further include determining an operating priority for each of the plurality of power sources based on operating constraints associated with the respective power source. The operations further include determining a load share for each of the plurality of power sources based on at least the total power output, the BSFC curves, and the operating priorities.

DETAILED DESCRIPTION

Figure 1:
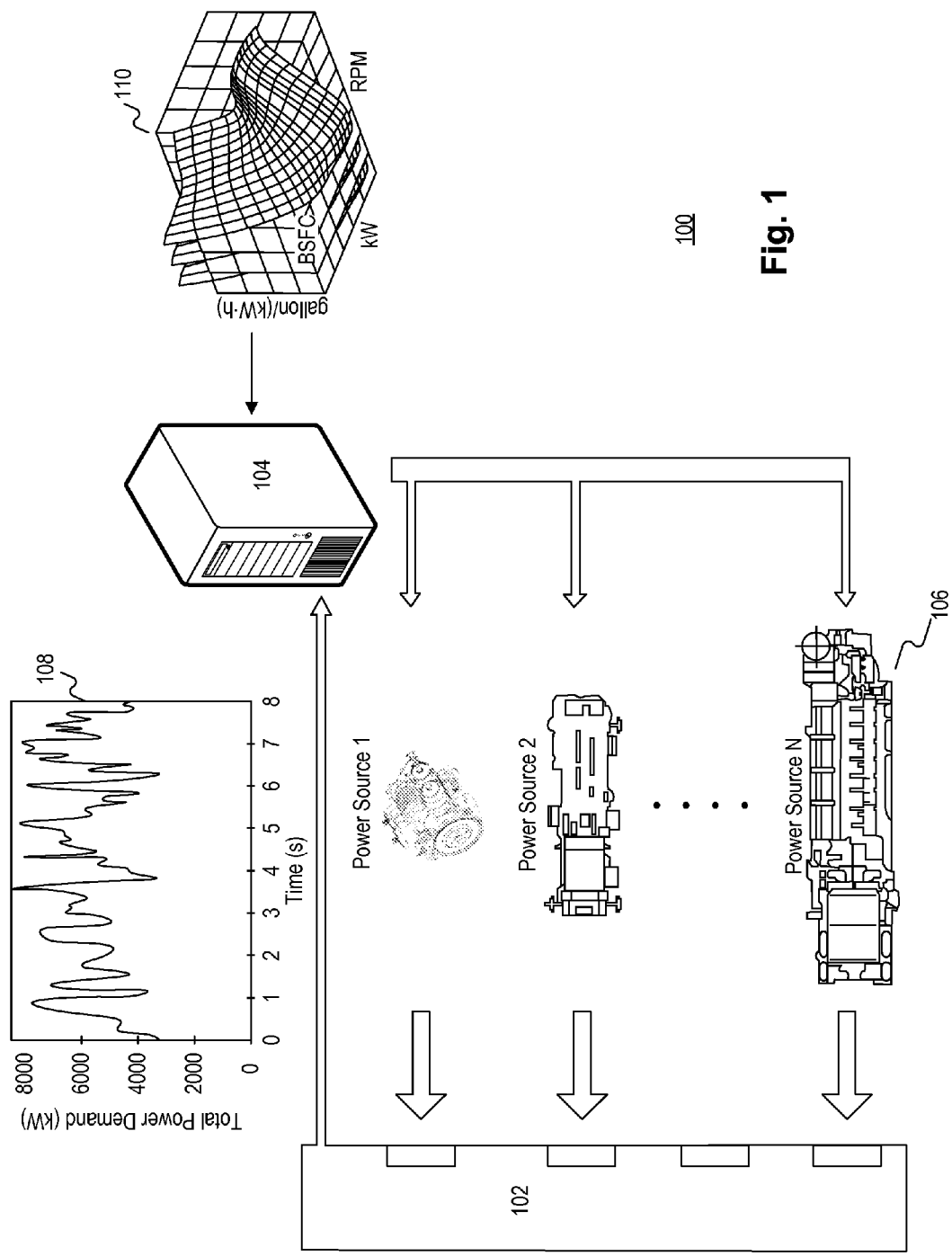
FIG. 1 is a schematic illustration of a power system of managing load sharing among multiple power sources, according to an exemplary embodiment.

FIG. 1 illustrates an exemplary power system 100 used in a machine and configured to supply power to one or more loads. The machine includes multiple power generating units and may be a marine vessel, an airplane, a large vehicle, etc. For illustration purposes only, the following description assumes the machine to be a marine vessel. But those skilled in the art will appreciate the present disclosure is not limited to a marine vessel.

Referring to FIG. 1, the power system 100 may include, among other things, a load manager 102, a power distribution module 104, and a plurality of power sources 106. The load manager 102 determines a demand for power from the power sources 106 based on input received from a central controller of the vessel and/or on actual outputs (e.g., a performance) of the one or more loads. The power distribution module 104 determines a load share for each of the power sources 106 to reduce the total fuel consumption of the power sources 106. Each of the power sources 106 creates mechanical and/or electrical power output that is equal to the respective load share.

The power sources 106 may embody any number and type of combustion engines, some or all of which that are connected to corresponding generators to form generator sets. The mechanical outputs of the combustion engines may be routed directly to the loads (e.g., mechanically routed to drive shafts, such as the propeller drive shaft for the vessel) and/or indirectly by way of the generators (e.g., electrically routed to motors of the propellers and to the other auxiliary loads). In exemplary embodiments, different power sources 106 may collaborate to satisfy the power demand determined by the load manager 102. By including a mix of different types and/or sizes of generator sets, benefits associated with the different sets may be realized. For example, larger medium-speed generator sets may be capable of greater power output at higher fuel efficiency (i.e., lower fuel consumption) and/or lower emissions, while smaller high-speed generator sets may be capable of faster transient response and high-efficiency low-load operation. A particular vessel could include all identical generator sets, all different generator sets, or any other configuration of generator sets, as desired. Power sources other than engines and generators may also be used to power the vessel, for example batteries, fuel cells, or other power storage devices.

The load manager 102 may be configured to compare an actual output of the power system 100 to a desired output (e.g., to achieve a desired travel speed or load carrying capability), and to responsively determine a power demand based on the difference. In exemplary embodiments, the load manager 102 includes one or more generator controllers that are configured to compare an actual bus voltage to a desired voltage and to responsively generate commands for a change in electrical power supply based on the difference. For example, a drive shaft of a vehicle may be driven by a motor that is electrically powered from a common bus and directly controlled via the central controller. An operator of the vehicle may move a throttle lever to command the vehicle to move at a particular desired speed. In the case of an exemplary marine vessel, signals from the central controller may cause the propellers connected to one or more drive shafts to rotate faster or slower, or to completely stop. As the speed of the one or more drive shafts is varied, the motors associated with the drive shafts may consume more or less electricity from the common power bus. This change in power consumption may cause a corresponding voltage fluctuation in the bus, and the load manager 102 may monitor the voltage fluctuation and responsively generate the demand for more or less electrical power to be supplied by the power sources 106 to the bus.

In another example, the load manager 102 may be a stand-alone component and configured to compare an actual vessel or propeller speed to a desired speed and to responsively generate a control signal indicative of a demand for a change in power (mechanical and/or electrical) based on the difference. In yet another example, the load manager 102 may compare an actual vessel position and/or orientation to a desired position or orientation, and responsively generate a control signal indicative of a demand for a change in power based on the difference. Other comparisons may also be instituted by the load manager 102, and the load manager 102 may take any methods and structures known in the art for determining the power demand.

In exemplary embodiments, the load manager 102 may also determine the identity of the loads that demand the power. For example, the load manager 102 may be configured to periodically communicate with the central controller about which loads are currently consuming power.

Referring to FIG. 1, the load manager 102 may create a signal indicative of a total power demand 108 as a function of time. The total power demand 108 may include significant power transients (e.g., when the vessel is in a dynamic positioning mode), or may be mostly a constant with occasional fluctuations (e.g., when the vessel is in a stationary mode). Signals generated by the load manager 102 indicative of the total power demand 108 and identities of the loads consuming the power may be directed to the power distribution module 104 for further processing.

The power distribution module 104 may take many forms, including, for example, a computer based system, a microprocessor based system, a microcontroller, an electronic control module (ECM), an electronic control unit (ECU), or any other suitable control type circuit or system. The power distribution module 104 may include various components that cooperate to determine a power output to be directed from each power source 106. For example, the power distribution module 104 may include a processor, a memory, a storage device, an input/output (I/O) device. The processor may include one or more commercially available microprocessors, microcontrollers, digital signal processors (DSPs), and other similar devices that may be configured to perform the functions of the processor. The memory may include one or more devices configured to store information used by the processor to perform certain functions related to the disclosed embodiments. For example, the memory may store one or more programs loaded from the storage device or elsewhere that, when executed, enable the power distribution module 104 to compute and distribute the load shares among the power sources 106. The storage device may include a volatile or non-volatile, magnetic, semiconductor, tape, optical, removable, nonremovable, or other type of storage device or computer-readable medium. The power distribution module 104 may also include one or more of an application-specific integrated circuit (ASIC), a field-programmable gate array (FPGA), a computer system, and a logic circuit, configured to allow the power distribution module 104 to function in accordance with the disclosed embodiments. Accordingly, the memory of the power distribution module 104 may include, for example, the flash memory of an ASIC, flip-flops in an FPGA, the random access memory of a computer system, a memory circuit contained in a logic circuit, etc.

The power distribution module 104 may alternatively or additionally be communicatively coupled with an external computer system. It should also be appreciated that the power distribution module 104 could readily be embodied in a general vessel controlling system capable of controlling numerous vessel functions. The power distribution module 104 may communicate with other components of the controlling system via datalinks or other methods. Various other known circuits may be associated with the power distribution module 104, including power supply circuitry, signal-conditioning circuitry, actuator driver circuitry (i.e., circuitry powering solenoids, motors, or piezo actuators), and communication circuitry.

The power distribution module 104 is configured to determine how much of a total power demand is to be produced by each of the multiple power sources 106 in order to reduce total fuel consumption. Specifically, the power distribution module 104 retrieves from each power source 106 (e.g., from a controller associated with each engine and/or with each generator) a Brake-Specific Fuel Consumption (BSFC) curve 110. Each BSFC curve 110 may be a two-dimensional curve measuring the fuel consumption rate of the respective power source 106 as a function of the produced power. Alternatively, the BSFC curve 110 may be a function of both the produced power and the engine speed, and thus a three-dimensional map. The BSFC curves 110 may be different for each power source 106 and/or for each different type of power source 106. The BSFC curves 110 may normally be used by the different power-source controllers to regulate fueling (e.g., start of injection timing, injection duration, injection pressure, injection amount, end of injection timing, number of injection pulses, etc.) of the different engines and/or field spacing of the different generators at a given engine speed. The power distribution module 104, however, may utilize these BSFC curves 110 to determine a combined fuel consumption rate of all the power sources 106 at different possible load-sharing configurations and then to select a particular configuration that achieves low fuel consumption.

The combined fuel consumption rate of all the power sources 106 may be expressed as a combined fuel consumption function:

$$f(P_{Total}) = \frac{P_1 f_1(P_1) + P_2 f_2(P_2) + \ldots + P_n f_n(P_n)}{P_1 + P_2 + \ldots + P_n} \quad \text{Eq. 1}$$

The combined fuel consumption function $f(P_{Total})$ may have a minimum value. Load-sharing configurations corresponding to this minimum value achieve high fuel efficiency. Thus, the process of searching for a load-sharing configuration achieving high fuel efficiency may be expressed by an objective function:

$$f_{min}(P_{Total}) = \min_{P_1, P_2 \ldots P_n} \frac{P_1 f_1(P_1) + P_2 f_2(P_2) + \ldots + P_n f_n(P_n)}{P_1 + P_2 + \ldots + P_n} \quad \text{Eq. 2}$$

$$\text{subject to } P_{Total} = P_1 + P_2 + \ldots + P_n \quad \text{Eq. 3}$$

$$\text{and } P_{min,i} \leq P_i \leq P_{max,i}, i = 1, 2, \ldots n \quad \text{Eq. 4}$$

Here, $f_i(P_i)$ is the BSFC curve for each power source 106. $P_i$ is the load share of each power source 106. $P_{min,i}$ and $P_{max,i}$ are respectively the minimum and maximum allowable power output for each power source 106. $P_{min,i}$ and $P_{max,i}$ can be determined based on the specifications of each power source 106. $P_{Total}$ is the total power demand 108 determined by the load manager 102.

Based on Eqs. 2-4, the power distribution module 104 may be configured to run an optimization algorithm to search for a set of load shares $(P_1, P_2, \ldots P_n)$ that make the combined fuel consumption function $f(P_{Total})$ reach the minimum value. The optimization algorithm can be any optimization algorithm in the art. For example, the optimization algorithm may be a particle swarm optimization (PSO) algorithm. The PSO algorithm iteratively tunes each of the load shares $(P_1, P_2, \ldots P_n)$ within the respective search space until the combined fuel consumption function $f(P_{Total})$ reaches the minimum. In some embodiments, the PSO algorithm may be combined with other optimization methods, such as a Monte Carlo method, to improve the computation efficiency. For example, the power distribution module 104 may first implement a Monte Carlo algorithm to find initial values (i.e., initial positions for the tuning) for the load shares $(P_1, P_2, \ldots P_n)$, and then feed these initial values to the PSO algorithm.

In exemplary embodiments, the power distribution module 104 may use polynomials to represent two-dimensional BSFC curves 110 during the optimization. However, if the BSFC curves 110 are three-dimensional maps or highly nonlinear, the power distribution module 104 may look up the fuel consumption rates in the BSFC curves 110 during the optimization. Moreover, for the three-dimensional BSFC curves 110, the power distribution module 104 may generate the load-sharing configurations as a function of not only the total power demand 108, but also one or more engine speeds.

The power distribution module 104 is also configured to determine operating constraints associated with each power source 106. The operating constraints may include factors that affect the ability of the respective power source 106 to produce power output at any particular time. The operating constraints may include the model and/or type of the power source, the mechanical connection of the power source, the location of the power source on the bus, the on/off status of the power source, the operating range of the power source, the transient response time of the power source, the age and/or wear of the power source, the emissions produced by the power source, the compatibility of the power source with other power sources, the fuel available for use by the power source, etc. The operating constraints may be stored in the controllers of the power sources 106 or in a storage device. The operating constraints may also be derived by the power distribution module 104 based on other vessel parameters. Furthermore, the operating constraints may be set by a human operator.

The power distribution module 104 may determine an operating priority for each power source 106 based on the operating constraints. The operating priority specifies a priority of assigning a load share to the respective power source 106. For example, the power distribution module 104 may divide all the power sources 106 into three priority groups and specify that a lower-priority power source 106 will not be assigned a load share until each of the higher-priority power sources 106 has reached its designated operating limit. The power distribution module 104 may determine the operating priority based on one or more of the operating constraints. For example, if the location of a power source 106 on a bus is close to the load that the power will be directed to, the power distribution module 104 may assign a higher operating priority to the power source 106 because it may be more fuel efficient to transfer the power over a shorter distance. For another example, due to the wear of the power sources 106, the actual performance of each power source 106 may deviate from the associated BSFC curve 110. The power distribution module 104 may assign lower operating priorities to power sources 106 whose deviations exceed a predetermined degree.

The power distribution module 104 may also determine, based on the operating constraints, whether load shares assigned to the respective power source 106 and another power source 106 should be kept in a preset ratio. For example, if two power sources 106 of the same model are coupled to the same bus in the same mechanical configuration and are running at the same time, the power distribution module 104 may determine that the same load share should be assigned to these two power sources 106 because of their similarity.

In exemplary embodiments, if power sources 106 are divided into more than one priority groups, the power distribution module 104 may implement the above-described optimization in each priority group. Specifically, the objective function for each priority group can be expressed as:

$$f_{min}(P_{Total,m}) = \min_{P_1, P_2 \ldots P_n} \frac{P_{m,1} f_1(P_{m,1}) + P_{m,2} f_2(P_{m,2}) + \ldots + P_{m,q} f_n(P_{m,Q})}{P_{m,1} + P_{m,2} + \ldots + P_{m,Q}} \quad \text{Eq. 5}$$

subject to $$P_{Total} = P_{Total,1} + P_{Total,2} + \ldots + P_{Total,M} \quad \text{Eq. 6}$$

$$P_{Total,m} = P_{m,1} + P_{m,2} + \ldots + P_{m,Q} \quad \text{Eq. 7}$$

and $$P_{min,i} \leq P_{m,i} \leq P_{max,i}, i = 1, 2, \ldots n \quad \text{Eq. 8}$$

Here, M denotes the number of priority groups, and Q denotes the number of power sources in a priority group. $P_{Total,m}$ is the portion of the total power demand 108 that is to be directed from each priority group. The power distribution module 104 may calculate the $P_{Total,m}$ based on the total power demand 108 and the operating priority associated with the power sources 106. Similar to the above-described optimization process, the power distribution module 104 may run an optimization algorithm for each priority group based on Eqs. 5-8 to obtain a load share for each of the power source 106 in the respective priority group.

Within each priority group, the power distribution module 104 may determine whether there are multiple identical power sources 106 based on the BSFC curves 110 and operating constraints. For example, if two power sources 106 have the same BSFC curve, the same operating range, and the same model, the power distribution module 104 may determine that the two power sources 106 are identical.

After determining a priority group has multiple identical power sources 106, the power distribution module 104 may further determine whether the same load share should be assigned to two or more of the identical power sources 106. Because the identical power sources 106 with the same load share also have the same BSFC curve, the power distribution module 104 may treat these power sources 106 as one power source in the optimization process according to Eqs. 5-8. This way, the number of variables to be tuned in the optimization is reduced and therefore the computation efficiency is increased.

In exemplary embodiments, the power distribution module 104 may run the above-described optimizations in real time and respond to the total power demand 108 from the load manager 102 in a few milliseconds. Alternatively, the power distribution module 104 may first generate offline a load-sharing map for the power sources 106, and then use the load-sharing map in real time to look up a load-sharing configuration corresponding to the total power demand 108.

Figure 2:
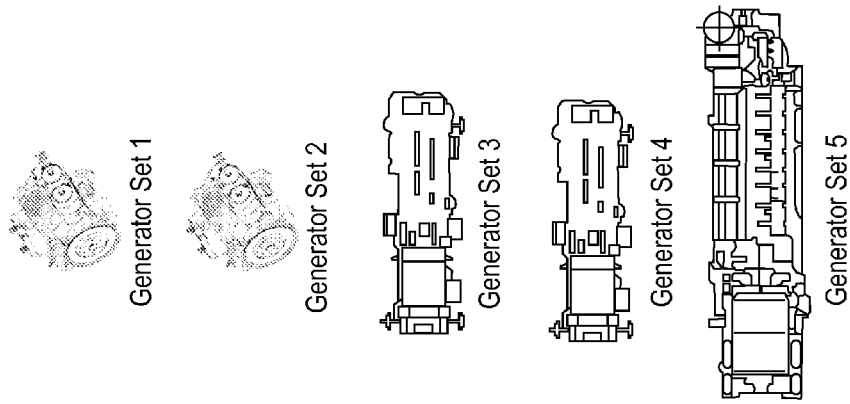
FIG. 2 is a schematic illustration of an operation of the power system of FIG. 1, according to an exemplary embodiment.

FIG. 2 illustrates an exemplary operation of the power system 100. In the embodiment disclosed in FIG. 2, the vessel has five generator sets. The generator sets 1 and 2 are identical, each being capable of producing 2,000 kW. The power distribution module 104 assigns the generator sets 1 and 2 to a first priority group, and the generator sets 3-5 into a second priority group. The power distribution module 104 further determines that the second priority group should not be used until the first priority group has reached 75% of its capacity. Accordingly, if the total power demand is 10,000 kW, the power distribution module 104 determines that 3,000 kW should be directed from the first priority group, and 7,000 kW should be directed from the second priority.

The power distribution module 104 may optimize the load shares for the first and the second priority groups separately. In the first priority group, the power distribution module 104 may determine that the generator sets 1 and 2 are not constrained to have the same load share. Thus, the power distribution module 104 treats the generator sets 1 and 2 individually during the optimization. The optimization result may indicate that the generator sets 1 and 2 should respectively produce 60% and 40% of the 3,000 kW assigned to the first priority group. In the second priority group, the power distribution module 104 may determine that the generator sets 3 and 4 should have the same load share. Thus, the power distribution module 104 only uses one load share to represent the generator sets 3 and 4 in the optimization. The optimization result may indicate that the generator sets 3-5 should respectively produce 25%, 25%, and 50% of the 7,000 kW assigned to the second priority group.

INDUSTRIAL APPLICABILITY

Figure 3:
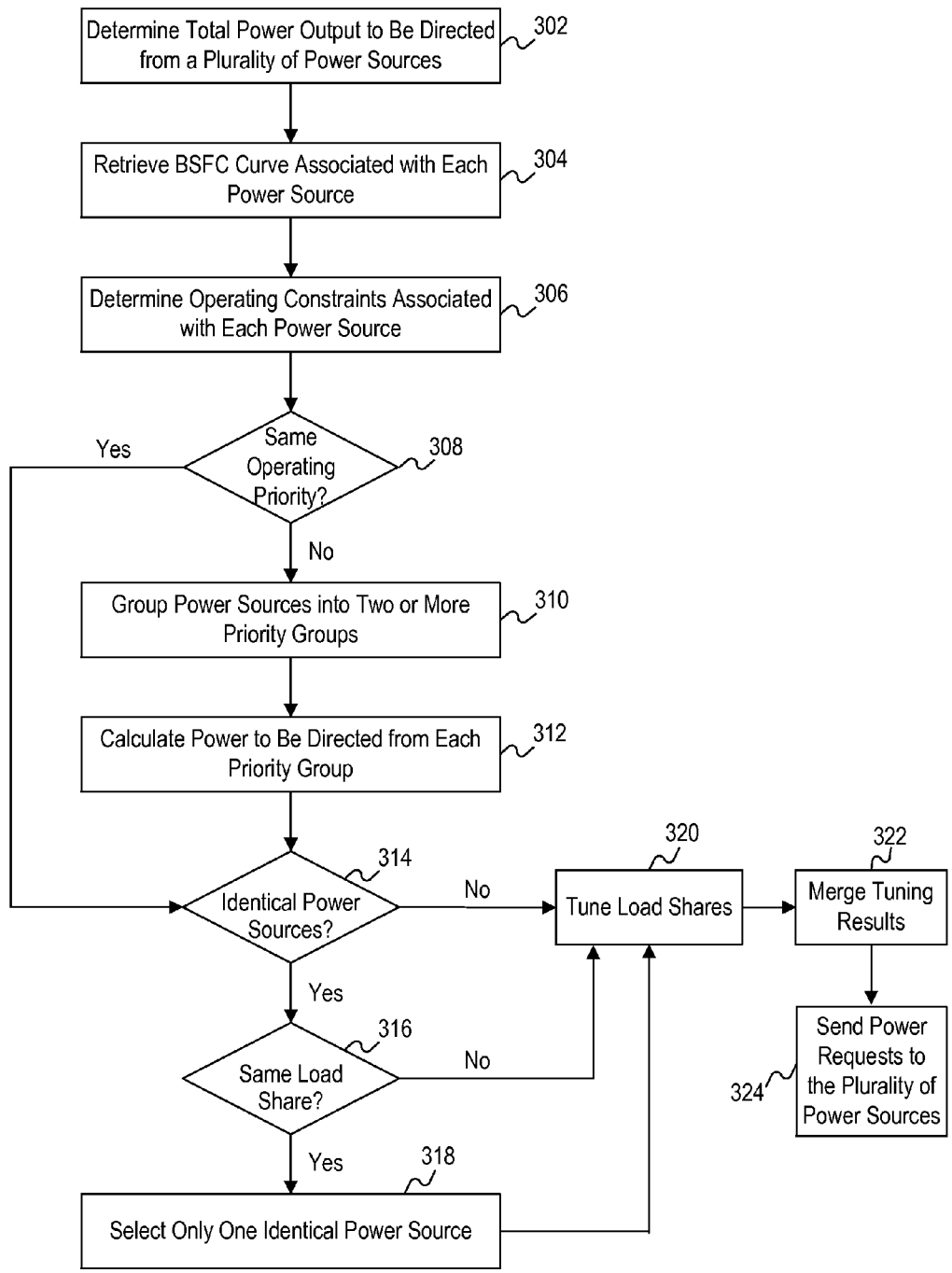
FIG. 3 is a flowchart illustrating a method of managing load sharing among multiple power sources, according to an exemplary embodiment.

The disclosed power system 100 may be applicable to any mobile machine where multiple power sources cooperate to drive the mobile machine and to power auxiliary loads under varying conditions. The power system 100 may reduce the overall fuel consumption through the optimization of load sharing under various operating constraints. Thus, the power system 100 can be used for a combination of highly diverse power sources. Operation of the power system 100 will now be described in connection with the flowchart of FIG. 3.

In step 302, the power distribution module 104 determines a total power output to be directed from a plurality of power sources 106. The total output is equal to the total power demand 108. The power distribution module 104 may receive a signal indicative of the total power demand 108 from the load manager 102. The load manager 102 may generate the signal indicative of the total power demand 108 based on, for example, a voltage level detected on a common bus directing power from the power sources 106 to one or more loads (e.g., propellers and an HVAC system) of the mobile machine.

In step 304, the power distribution module 104 retrieves a BSFC curve 110 associated with each power source 106. The BSFC curve 110 may be a two-dimensional curve as a function of the produced power, or a three-dimensional map as a function of both the produced power and the engine speed. As discussed above, the power distribution module 104 may retrieve the BSFC curves 110 from the controllers associated with the power sources 106. Alternatively, the BSFC curves 110 may be stored in a storage device, and the power distribution module 104 may access the storage device to retrieve the BSFC curves 110.

In step 306, the power distribution module 104 determines the operating constraints associated with each power source 106. The operating constraints may include, for example, the power source's model and/or type, location on the bus, on/off status, transient response time, etc. The power distribution module 104 may determine the operating constraints based on the specifications of each power source 106, load information received from the load manager 102, commands received from the central controller of the mobile machine, etc. The operating constraints may also be specified and input by a human operator through a user interface of the power system 100.

In step 308, the power distribution module 104 determines whether the power sources 106 have the same operating priority based on the operating constraints. The operating priority specifies a priority for assigning a load share to the respective power source 106. The power distribution module 104 may define that a lower-priority power source 106 will not be assigned a load share until all the higher-priority power sources have reached their designated operating limits. There are many situations where it is desired to differentiate the power sources 106 into different operating priorities. For example, small high-speed generator sets may be capable of fast transient response and high-efficiency low-load operation. Thus, when the mobile machine is doing fast maneuvers, it may be preferred to use the small high-speed generator sets over other types of generator sets. If the power sources 106 do not have the same operating priority, the power distribution module 104 proceeds to step 310. If all the power sources 106 have the same operating priority, the power distribution module 104 skips steps 310 and 312, and directly proceeds to step 314.

In step 310, if the power sources 106 do not have the same operating priority, the power distribution module 104 groups the power sources 106 into two or more priority groups based on the operating priorities determined in step 306. The power sources 106 in the same priority group have the same operating priority.

In step 312, the power distribution module 104 calculates a power to be directed from each priority group, based on the total power output and the operating priorities. For example, assuming there are two priority groups and the operating priorities indicate that the load shares should not be assigned to the lower-priority group until the higher-priority group has reached the designated operating limit, if the total power demand is 10,000 kW and the designated operating limit is 7,000 kW, the power distribution module 104 may determine that the power directed from the higher-priority group is 7,000 kW and the power to be directed from the lower-priority group is 3,000 kW.

In step 314, the power distribution module 104 determines whether two or more power sources 106 in a priority group are identical. For example, when two power sources 106 have the same BSFC curve, the same operating range, and the same model, the power distribution module 104 determines that the two power sources 106 are identical. If a priority group has two or more identical power sources 106, the power distribution module 104 proceeds to step 316. If not, the power distribution module 104 skips steps 316 and 318, and directly proceeds to step 320.

In step 316, if two or more power sources 106 in a priority group are identical, the power distribution module 104 determines whether the identical power sources 106 should be assigned the same load share, based on the operating constraints determined in step 306. For example, when two identical generator sets are connected to the same bus, it may be desired to assign the same load share to these two generator sets. If at least two identical power sources 106 in the priority group should be assigned the same load share, the power distribution module 104 proceeds to step 318. If not, the power distribution module 104 skips step 318 and directly proceeds to step 320.

In step 318, if at least two identical power sources 106 in a priority group should be assigned the same load share, the power distribution module 104 selects only one of the at least two identical power sources 106 for load-share optimization. Because the at least two identical power sources 106 have the same BSFC curve and the same load share, they only need to be represented by one load share in the optimization.

In step 320, the power distribution module 104 tunes the load share of each power source 106 to search for a combined load-sharing configuration that reduces the total fuel consumption. The power distribution module 104 may tune the load shares by running an optimization algorithm based on Eqs. 2-4 if all the power sources 106 have the same operating priority, or based on Eqs. 5-8 if there are multiple priority groups. Specifically, in the case of the same operating priority, the power distribution module 104 runs the optimization algorithm for the total power output, such that the combined fuel consumption function $f(P_{Total})$ for all the power sources 106 reaches the minimum value; while in the case of multiple priority groups, the power distribution module 104 runs the optimization algorithm in each priority group for the power to be directed from the respective priority group, such that the combined fuel consumption function $f(P_{Total,m})$ for the respective priority group reaches the minimum value. In exemplary embodiments, the optimization algorithm may be one or more of a PSO algorithm, a Monte Carlo algorithm, or any other algorithms known in the art.

In step 322, the power distribution module 104 merges the tuning result for each power source 106 and generate a combined load-sharing configuration for the given total power output (i.e., the total power demand 108).

In step 324, the power distribution module 104 sends power requests to the plurality of power sources 106 based on the tuning results. In exemplary embodiments, for each power source 106 with a non-zero load share in the combined load-sharing configuration, the power distribution module 104 sends a command to the controller associated with the power source 106 to make the power source 106 generate a power output equal to the load share.

The disclosed exemplary embodiments provide a flexible solution to reduce the total fuel consumption of multiple power sources. By dividing the multiple power sources into different priority groups, the system 100 considers operating constraints associated with each individual power source and may achieve high fuel efficiency without compromising other operational goals of the mobile machine. For example, when the mobile machine is in an operational mode requiring fast transient responses, high-speed generator sets may be preferred and given higher operating priorities in the load sharing. Moreover, by determining whether the power sources are identical and/or have the same load share, the system 100 considers the similarity among the multiple power sources and may reduce the system complexity, save computing resources, and increase the system response speed. For example, when two identical power sources are connected to the same bus, assigning the same load share to them saves the trouble of using additional control electronics to unevenly distribute the load shares.

It will be apparent to those skilled in the art that various modifications and variations can be made to the disclosed power system for managing load sharing among multiple power sources. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A method of managing load sharing among a plurality of power sources, the method comprising:
    determining a total power output to be directed from the plurality of power sources to at least one power consumer;
    retrieving a Brake Specific Fuel Consumption (BSFC) curve associated with each of the plurality of power sources;
    determining an operating priority for each of the plurality of power sources based on operating constraints associated with the respective power source, the operating constraints including at least one of a type of the respective power source and a fuel available for use by the respective power source;
    determining a load share for each of the plurality of power sources based on at least the total power output, the BSFC curves, and the operating priorities, wherein determining the load share for each of the plurality of power sources comprises:
        determining two or more power sources to be identical based on the BSFC curves and the operating constraints, and
        determining, based on the operating constraints, that the two or more identical power sources have the same load share; and
    managing the load sharing among the plurality of power sources based on the determined load share for each of the plurality of power sources.

2. The method of claim 1, wherein determining the load share for each of the plurality of power sources comprises:
    grouping the plurality of power sources into two or more priority groups, such that power sources in the same priority group have the same operating priority;
    calculating, based on the total power output and the operating priorities, a power to be directed from each of the two or more priority groups; and
    determining the load share for each of the plurality of power sources based on at least the BSFC curves and the power to be directed from each of the two or more priority groups.

3. The method of claim 2, wherein a sum of the powers to be directed from the two or more priority groups is equal to the total power output.

4. The method of claim 2, further comprising:
    determining two or more power sources in a priority group to be identical based on the BSFC curves and the operating constraints; and
    determining, based on the operating constraints, that the two or more identical power sources have the same load share.

5. The method of claim 2, further comprising:
    tuning the load share for each power source in a priority group such that a total fuel consumption of the priority group achieves a minimum value.

6. The method of claim 1, wherein determining the load share for each of the plurality of power sources comprises:
    tuning the load share for each of the plurality of power sources such that a total fuel consumption of the plurality of power sources achieves a minimum value.

7. The method of claim 1, wherein determining the load share for each of the plurality of power sources comprises:
    determining the load share for each of the plurality of power sources using a particle swarm optimization algorithm.

8. The method of claim 1, further comprising:
    merging the load share determined for each of the plurality of power sources; and
    generating the merged load shares as a combined load-sharing configuration for the total power output.

9. A power system, comprising:
    a plurality of power sources configured to provide power to at least one power consumer;
    a load manager associated with the at least one consumer and configured to determine a total power output to be directed from the plurality of power sources to the at least one power consumer; and
    a power distribution module communicatively connected with the load manger and the plurality of power sources, the power distribution module being configured to:
        retrieve a BSFC curve associated with each of the plurality of power sources;
        determine an operating priority for each of the plurality of power sources based on operating constraints associated with the respective power source, the operating constraints including at least one of a type of the respective power source and a fuel available for use by the respective power source;
        determine a load share for each of the plurality of power sources based on at least the total power output, the BSFC curves, and the operating priorities;
        determine two or more power sources to be identical based on the BSFC curves and the operating constraints;
        determine, based on the operating constraints, that the two or more identical power sources have the same load share; and
        manage load sharing among the plurality of power sources based on the determined load share for each of the plurality of power sources.

10. The power system of claim 9, wherein the power distribution module is further configured to:
    group the plurality of power sources into two or more priority groups, such that power sources in the same priority group have the same operating priority;
    calculate, based on the total power output and the operating priorities, a power to be directed from each of the two or more priority groups; and
    determine the load share for each of the plurality of power sources based on at least the BSFC curves and the power to be directed from each of the two or more priority groups.

11. The power system of claim 10, wherein a sum of the powers to be directed from the two or more priority groups is equal to the total power output.

12. The power system of claim 10, wherein the power distribution module is further configured to:
    determine two or more power sources in a priority group to be identical based on the BSFC curves and the operating constraints; and determine, based on the operating constraints, that the two or more identical power sources have the same load share.

13. The power system of claim 10, wherein the power distribution module is further configured to:
tune the load share for each power source in a priority group such that a total fuel consumption of the priority group achieves a minimum value.

14. The power system of claim 9, wherein the power distribution module is further configured to:
tune the load share for each of the plurality of power sources such that a total fuel consumption of the plurality of power sources achieves a minimum value.

15. A non-transitory computer-readable storage medium storing instructions for managing load sharing among a plurality of power sources, the instructions causing at least one processor to perform operations comprising:
determining a total power output to be directed from the plurality of power sources to at least one power consumer;
retrieving a BSFC curve associated with each of the plurality of power sources;
determining an operating priority for each of the plurality of power sources based on operating constraints associated with the respective power source, the operating constraints including at least one of a type of the respective power source and a fuel available for use by the respective power source;
determining a load share for each of the plurality of power sources based on at least the total power output, the BSFC curves, and the operating priorities, wherein determining the load share for each of the plurality of power sources comprises:
determining two or more power sources to be identical based on the BSFC curves and the operating constraints, and
determining, based on the operating constraints, that the two or more identical power sources have the same load share; and
managing the load sharing among the plurality of power sources based on the determined load share for each of the plurality of power sources.

16. The non-transitory computer-readable storage medium of claim 15, wherein determining the load share for each of the plurality of power sources comprises:
grouping the plurality of power sources into two or more priority groups, such that the power sources in the same priority group have the same operating priority;
calculating, based on the total power output and the operating priorities, a power to be directed from each of the two or more priority groups; and
determining the load share for each of the plurality of power sources based on at least the BSFC curves and the power to be directed from each of the two or more priority groups.

17. The non-transitory computer-readable storage medium of claim 16, wherein a sum of the powers to be directed from the two or more priority groups is equal to the total power output.

* * * * *